(12) United States Patent
Mergener

(10) Patent No.: US 9,472,979 B2
(45) Date of Patent: Oct. 18, 2016

(54) POWER TOOL HAVING MULTIPLE BATTERY PACKS

(71) Applicant: Milwaukee Electric Tool Corporation, Brookfield, WI (US)

(72) Inventor: Matthew J. Mergener, Germantown, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 412 days.

(21) Appl. No.: 14/213,200

(22) Filed: Mar. 14, 2014

(65) Prior Publication Data

US 2014/0265604 A1 Sep. 18, 2014

Related U.S. Application Data

(60) Provisional application No. 61/783,539, filed on Mar. 14, 2013.

(51) Int. Cl.
*H02J 7/34* (2006.01)
*H02J 1/00* (2006.01)
*H02J 7/00* (2006.01)

(52) U.S. Cl.
CPC ............... *H02J 7/34* (2013.01); *H02J 7/0063* (2013.01); *H02J 7/0024* (2013.01); *H02J 2007/0067* (2013.01); *Y10T 307/696* (2015.04)

(58) Field of Classification Search
CPC ........................................................ H02J 1/00
USPC ........................................................... 307/65
See application file for complete search history.

(56) References Cited

U.S. PATENT DOCUMENTS

| 4,697,134 A | 9/1987 | Burkum et al. |
| 5,028,858 A | 7/1991 | Schnizler et al. |
| 5,422,558 A | 6/1995 | Stewart |

(Continued)

FOREIGN PATENT DOCUMENTS

| JP | 2001171445 | 6/2001 |
| JP | 2012525812 | 10/2012 |

(Continued)

OTHER PUBLICATIONS

Axminster Tool Centre, "Makita BVC01 Dual 18V Li-Ion Battery Adaptor to 36V" <http://www.axminster.co.uk/makita-bvc01-dual-18v-li-ion-battery-adaptor-to-36v> publicly available at least as early as Oct. 1, 2012.

(Continued)

*Primary Examiner* — Robert Deberadinis
(74) *Attorney, Agent, or Firm* — Michael Best & Friedrich LLP

(57) ABSTRACT

A power tool operable to receive a first battery pack and a second battery pack. The power tool including a motor; a first switch; a second switch; and a controller. The controller operable to monitor a first voltage of the first battery pack and a second voltage of the second battery pack, close the first switch and the second switch when the first voltage and the second voltage are within a predetermined range, open the first switch when the first voltage is outside of the predetermined range of the second voltage and the second voltage is greater than the first voltage, and open the second switch when the second voltage is outside of the predetermined range of the first voltage and the first voltage is greater than the second voltage.

20 Claims, 5 Drawing Sheets

(56) References Cited

U.S. PATENT DOCUMENTS

| | | |
|---|---|---|
| 5,621,301 A | 4/1997 | Allen et al. |
| 5,652,499 A | 7/1997 | Morita et al. |
| 5,742,148 A | 4/1998 | Sudo et al. |
| 6,064,178 A | 5/2000 | Miller |
| 6,127,801 A | 10/2000 | Manor |
| 6,133,711 A | 10/2000 | Hayashi et al. |
| 6,157,165 A | 12/2000 | Kinoshita et al. |
| 6,373,226 B1 | 4/2002 | Itou et al. |
| 6,387,553 B1 | 5/2002 | Putt et al. |
| 7,161,326 B2 | 1/2007 | Kubota et al. |
| 7,176,656 B2 | 2/2007 | Feldmann |
| 7,183,014 B2 | 2/2007 | Sasaki et al. |
| 7,564,217 B2 | 7/2009 | Tanigawa et al. |
| 7,659,699 B2 | 2/2010 | Boebel |
| 7,667,342 B2 | 2/2010 | Matsumoto et al. |
| 7,701,172 B2 | 4/2010 | Watson et al. |
| 7,838,142 B2 | 11/2010 | Scheucher |
| 7,989,985 B2 | 8/2011 | Patel |
| 8,025,118 B2 | 9/2011 | Scheucher |
| 8,253,378 B2 | 8/2012 | Lee et al. |
| 8,310,177 B2 | 11/2012 | Naumann et al. |
| 2005/0112416 A1 | 5/2005 | Sakakibara |
| 2005/0287880 A1 | 12/2005 | Okuyama |
| 2010/0102882 A1 | 4/2010 | Yoshino et al. |
| 2011/0012435 A1 | 1/2011 | Cohen et al. |
| 2011/0101909 A1 | 5/2011 | Bowman |
| 2011/0169455 A1 | 7/2011 | Nagase |
| 2011/0298626 A1 | 12/2011 | Fechalos et al. |
| 2012/0013304 A1 | 1/2012 | Murase et al. |
| 2012/0083948 A1 | 4/2012 | Tate, Jr. et al. |
| 2012/0139548 A1 | 6/2012 | Yang et al. |
| 2012/0182021 A1 | 7/2012 | McCoy et al. |
| 2012/0268057 A1 | 10/2012 | Wu |
| 2012/0293112 A1 | 11/2012 | Suzuki |
| 2013/0062955 A1 | 3/2013 | Suzuki |

FOREIGN PATENT DOCUMENTS

| | | |
|---|---|---|
| KR | 20050091862 | 9/2005 |
| WO | 2012/059470 | 5/2012 |

OTHER PUBLICATIONS

International Search Report and Written Opinion for Application No. PCT/US2014/028782 dated Jul. 21, 2014 (12 pages).

POWER TOOL HAVING MULTIPLE BATTERY PACKS

RELATED APPLICATION

The present application claims priority to U.S. Provisional Application 61/783,539, filed Mar. 14, 2013, the entire contents of which are hereby incorporated.

BACKGROUND

The present invention generally relates to power tools and, more particularly, to lawn and garden power tools, such as string trimmers, hedge-trimmers, leaf-blowers, etc.

SUMMARY

In one embodiment, the invention provides a power tool operable to receive a first battery pack and a second battery pack. The power tool including a first battery receptacle configured to receive the first battery pack; a second battery receptacle configured to receive the second battery pack; a motor; a first switch connected in series with the first battery receptacle and the motor; a second switch connected in series with the second battery receptacle and the motor; and a controller. The controller operable to monitor a first voltage of the first battery pack and a second voltage of the second battery pack, close the first switch and the second switch when the first voltage and the second voltage are within a predetermined range, open the first switch when the first voltage is outside of the predetermined range of the second voltage and the second voltage is greater than the first voltage, and open the second switch when the second voltage is outside of the predetermined range of the first voltage and the first voltage is greater than the second voltage.

In another embodiment the invention provides a method of operating a power tool with a first battery and a second battery connected in parallel, a first switch being connected in series with the first battery and the power tool, a second switch being connected in series with the second battery and the power tool. The method including with a controller, monitoring a first voltage of the first battery and a second voltage of the second battery; when the first voltage of the first battery and the second voltage of the second battery are within a predetermined range, closing the first switch to connect the first battery to the power tool and closing the second switch to connect the second battery to the power tool; when the first voltage of the first battery is outside of the predetermined range of the second voltage of the second battery and the second voltage of the second battery is greater than the first voltage of the first battery, opening the first switch to disconnect the first battery from the power tool; and when the second voltage of the second battery is outside of the predetermined range of the first voltage of the first battery and the first voltage of the first battery is greater than the second voltage of the second battery, opening the second switch to disconnect the second battery from the power tool.

Independent aspects of the invention will become apparent by consideration of the detailed description and accompanying drawings.

DETAILED DESCRIPTION

Figure 1:
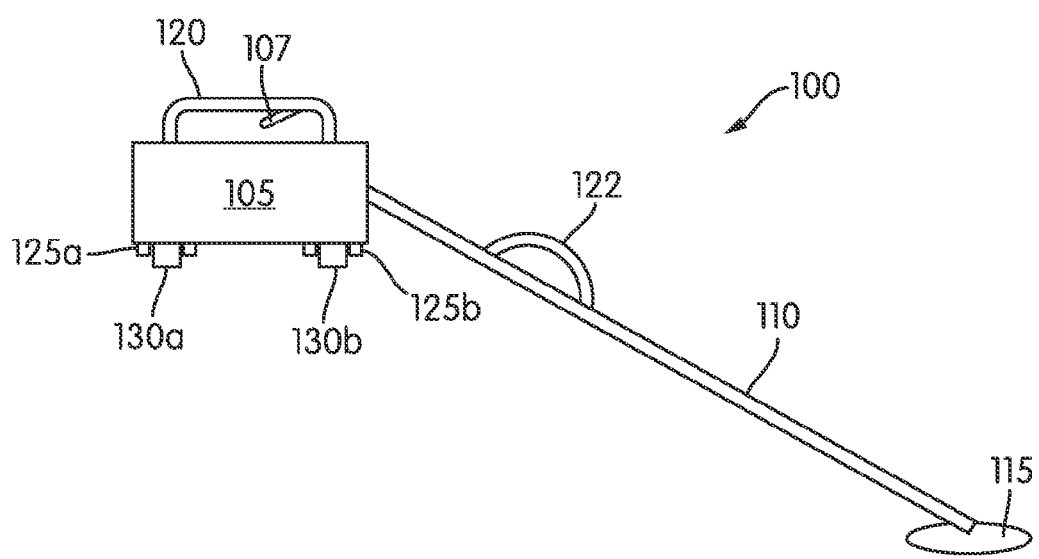
FIG. 1 is a block diagram illustrating a power tool.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

It should be noted that a plurality of hardware and software based devices, as well as a plurality of different structural components may be utilized to implement aspects of the invention. Furthermore, specific configurations described or illustrated in the drawings are intended to exemplify independent embodiments of the invention and that other alternative configurations are possible. The terms "controller", "processor", "central processing unit" and "CPU" are interchangeable unless otherwise stated. Where the terms "controller", "processor", "central processing unit" or "CPU" are used as identifying a unit performing specific functions, it should be understood that, unless otherwise stated, those functions can be carried out by a single processor or multiple processors arranged in any form, including parallel processors, serial processors, tandem processors or cloud processing/cloud computing configurations.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Furthermore, throughout the specification, if capitalized terms are used, such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Traditionally, lawn and garden power tools are powered by a gasoline engine, 120-volt AC power source, or a DC battery power source.

Connecting multiple battery packs in parallel generally increases the capacity (ampere-hours) of the battery system, while maintaining the voltage of the individual battery packs. However, if the voltages of the battery packs connected in parallel are not approximately equal, issues can arise.

One such issue is cross charging. Cross charging can occur if one battery pack is at a reasonably higher voltage, or state of charge, than the voltage of another parallel-connected battery pack. If this occurs, current from the battery pack at the higher voltage will flow into the battery pack at the lower voltage. This current can become relatively large (e.g., 25 A) and, therefore, can be hazardous to the battery packs, especially in certain operating conditions (e.g., at low temperature). Cross charging can also occur when the battery packs connected in parallel have unequal capacity size.

Another issue may arise if one of the battery packs connected in parallel becomes fully discharged before the other battery pack. If this occurs, the battery pack which is fully discharged, but still connected, can be permanently damaged.

Another issue may arise if one of the battery packs connected in parallel becomes over-heated. If this occurs, the battery pack which is over-heated, but still connected, can be permanently damaged. In order to overcome such issues, among other, the following invention is described.

The invention described herein generally relates to systems, methods, devices, and computer readable media associated with a power tool which receives power from parallel-connected batteries.

FIG. 1 is a block diagram illustrating a power tool 100. The illustrated power tool 100 includes a lawn and garden power tool, such as a string trimmer, hedge-trimmer, chainsaw, leaf-blower/vacuum, etc. In other constructions, the power tool 100 may include another type of power tool, such as a circular saw, reciprocating saw, drill, hammer, etc.

The power tool 100 generally includes a housing 105, a user-switch 107, a driveshaft section 110, and a tool head 115. The housing 105 includes a user-handle 120 and battery interfaces 125a, 125b. The user-handle 120 allows a user to hold and manipulate the power tool 100. The illustrated user-handle 120 is a pull handle (e.g., a U-shaped handle). In another embodiment, the user-handle 120 may be a grip handle (e.g., a stem-handle generally seen on a power tool, such as a drill). The user-switch 107 is located on the user-handle 120. An auxiliary handle 122 may be located on the driveshaft section 110. The auxiliary handle 122 may be a pull handle (as illustrated) or a grip handle.

The tool head 115 varies depending on the functionality of the power tool 100. In one embodiment, the tool head 115 includes a string-trimmer head used for trimming grass or other plant objects. In other embodiments, the tool head 115 includes a chainsaw blade used for cutting trees and larger plant objects, a hedge trimmer head used for trimming bushes or other plant objects, a fan used for a leaf blower/vacuum, etc. The tool head 115 may be interchangeable such that the various head types may be selectively used with the power tool 100.

The battery interfaces 125a, 125b selectively secure batteries 130a, 130b to the power tool 100. In the illustrated construction, the power tool 100 includes two battery interfaces 125a, 125b, each operable to support a corresponding battery 130a, 130b. In other constructions, the power tool 100 may include more than two battery interfaces 125 and be operable to support a corresponding number of batteries 130.

In one construction, the batteries 130a, 130b are rechargeable lithium-ion batteries. In other constructions, the batteries 130a, 130b may have a chemistry other than lithium-ion such as, for example, nickel cadmium, nickel metal-hydride, etc. Additionally or alternatively, the batteries 130a, 130b may be non-rechargeable batteries. In one embodiment, the batteries 130a, 130b are power tool battery packs including a pack housing containing one or more battery cells and latching mechanisms for selectively securing the batteries 130a, 130b to the battery interfaces 125a, 125b. Such a power tool battery pack is described and illustrated in U.S. Pat. No. 7,714,538, issued May 11, 2010, the entire contents of which is hereby incorporated by reference.

As discussed in further detail below, the illustrated batteries 130a, 130b include battery controllers 131a, 131b within the pack housing. The battery controllers 131a, 131b, among other things, monitor characteristics of the battery cells and the batteries 130a, 130b. The characteristics may include, but are not limited to, input current, output current, temperature, individual cell voltage, and total pack voltage. The illustrated battery controllers 131a, 131b also perform control functions for the batteries 130a, 130b (e.g., disable operation of a battery in case of an abnormal battery condition, end of discharge, etc.).

In the illustrated embodiment, the batteries 130a, 130b are connected parallel. The batteries 130a, 130b connected in parallel generally output the same voltage level as would one of the batteries 130a, 130b (e.g., approximately 20V). However, the capacity of the batteries 130a, 130b combined is greater than one battery 130a or 130b taken alone. Therefore, the batteries 130a, 130b connected in parallel generally provide an extended runtime compared to a system using only one battery 130a, 130b. As described below, the batteries 130a, 130b may have unequal current capacities or unequal states of charge (e.g., a fully charged battery and a fully depleted battery).

The current capacity of the batteries 130a, 130b is generally determined by a number of battery cells placed in a parallel connection. The greater the number of battery cells in parallel in a battery 130a, 130b, the higher the capacity. In some embodiments, a battery 130a, 130b may have two cells in parallel and a nominal capacity of, for example, 2.2 Ah, 2.6 Ah, 3.0 Ah, 4.0 Ah, etc. In other embodiments, a battery 130a, 130b may have one cell in parallel and a nominal capacity of, for example, 1.1 Ah, 1.3 Ah, 1.5 , Ah, 2.0 Ah, 2.5 Ah, etc.

The voltage of the batteries 130a, 130b is generally determined by the number of battery cells placed in a series connection. In some embodiments, each battery cell has, for example, a nominal voltage of approximately 4V. The batteries 130a, 130b may have five such cells and, thus, a total nominal battery voltage of approximately 20V.

Figure 2:
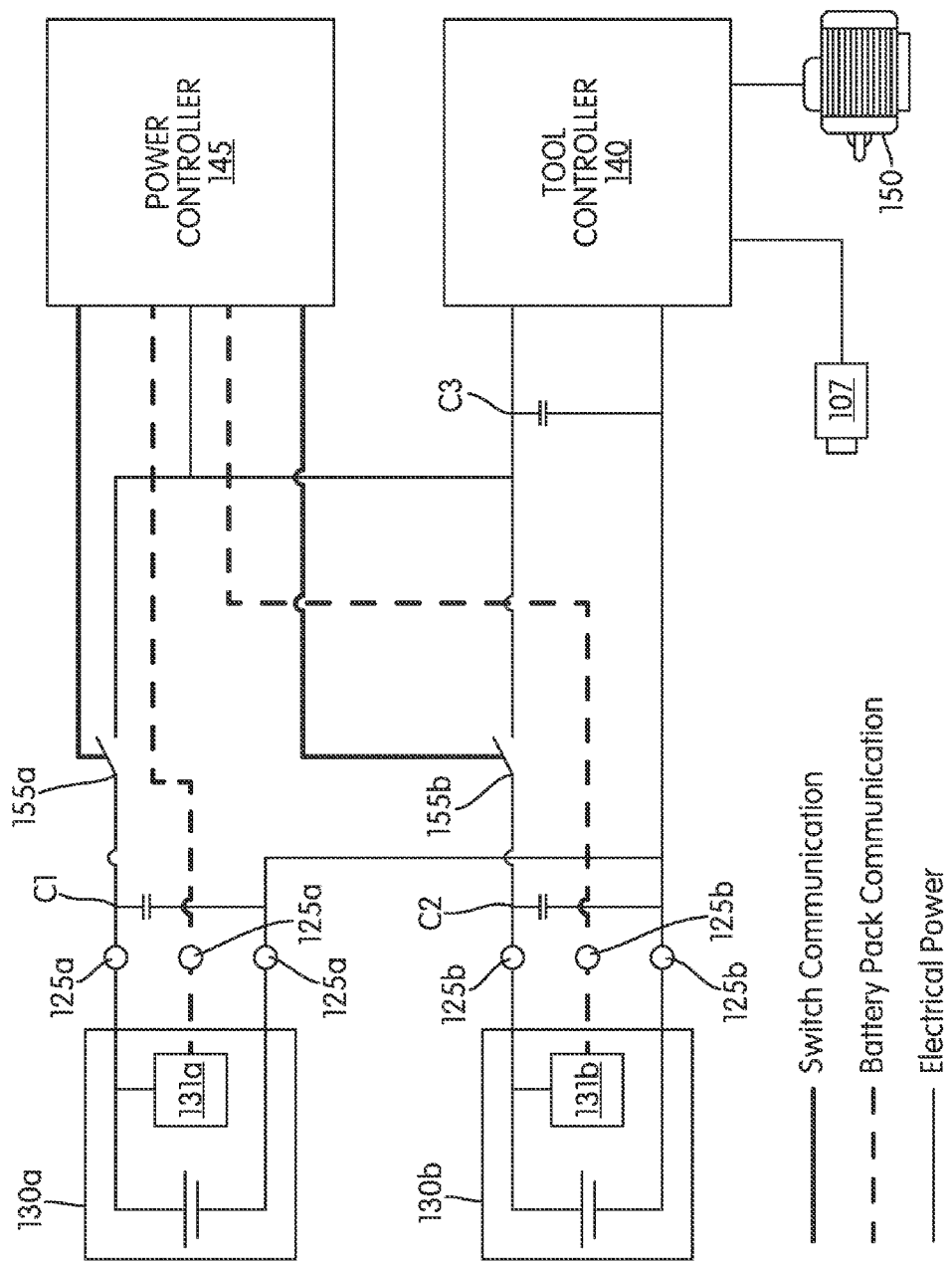
FIG. 2 is an electrical schematic of electronics and circuitry of the power tool of FIG. 1.

FIG. 2 is an electrical schematic of the power tool 100. The illustrated power tool 100 further includes, within the housing 105, a tool controller 140, a power controller 145, a motor 150, and capacitors C1, C2, C3.

In one embodiment, the tool controller 140 includes a microcontroller operable to, among other things, control the operation of the power tool 100. In some embodiments, the tool controller 140 includes a plurality of electrical and electronic components that provide power, operational control, protection, etc. to the components and modules within the tool controller 140 and within the power tool 100. For example, the tool controller 140 includes, among other things, a processor, memory, and an input/output unit.

In one embodiment, the power controller 145 is a microcontroller having a similar construction as the tool controller 140. The power controller 145 communicates with the battery controller 131a, 131b of each battery 130a, 130b. In the illustrated construction, the power controller 145 further controls switching elements 155a, 155b which selectively allow the supply of power from the batteries 130a, 130b to the tool controller 140 for powering the power tool 100 (e.g., the motor 150). In one embodiment, the switching elements 155a, 155b include one or more transistors such as MOSFETs or power MOSFETs. In one construction, the source electrodes of the MOSFETs face toward the batteries 130a, 130b.

In one embodiment, the motor 150 is a direct-current brushless electric motor. Alternatively, the motor 150 may be another motor type, such as an alternating-current electric motor, a direct-current brushed electric motor, etc. The motor 150 is controlled by the tool controller 140. The tool controller 140 receives a signal from the user-switch 107 and activates or deactivates the motor 150 according to the activation or deactivation of the user-switch 107.

In operation, a user activates the user-switch 107, and the tool controller 140 receives an activation signal from the user-switch 107. Upon receiving the activation signal from the user-switch 107, the tool controller 140 activates the motor 150, which receives power from the parallel-connected batteries 130a, 130b through the controller 140. For instance, the tool controller 140 controls switching elements (e.g., MOSFETs) to selectively supply power from the parallel-connected batteries 130a, 130b to terminals of the motor 150 to drive the rotor of the motor 150.

The power controller 145 receives a signal from the battery controller 131a, 131b indicative of respective characteristics (e.g., voltage) of the batteries 130a, 130b. As mentioned above, if the voltages of batteries 130a, 130b coupled in parallel are not substantially equal (e.g., within a range of 0V to 500 mV), reverse charging can occur in the battery having the lower voltage. To prevent reverse charging and/or other issues that may arise in this situation, the power controller 145 controls the switching elements 155a, 155b to regulate the voltages of the batteries 130a, 130b by maintaining the respective voltages of the batteries 130a, 130b substantially equal.

To regulate the voltages of the batteries 130a, 130b, the power controller 145 turns the respective switching elements 155a, 155b on or off. For example, if the voltage of battery 130a is relatively higher than the voltage of battery 130b, the power controller 145 turns off switching element 155b, thus stopping current from battery 130b to the power tool 100. The power tool 100 is then solely powered by battery 130a. Once the voltage of battery 130a has dropped to a level that is substantially equal to the voltage level of battery 130b, the power controller 145 turns switching element 155b back on, such that the power tool 100 is powered by both parallel-connected batteries 130a, 130b.

In some instances during discharging at heavy loads, there is little to no risk of cross charging even when the voltages of batteries 130a, 130b are not substantially equal. This is because the discharge current and the discharge voltage drops are so low that both packs will be discharging. Therefore, in some embodiments, during discharge at heavy loads, the power controller 145 will turn the switching elements 155a, 155b on, even when the voltages of the batteries 130a, 130b are not substantially equal.

In operation, the power controller 145 continually monitors whether the batteries 130a, 130b are in an operational mode. In some embodiments, if a battery 130a or 130b is non-operational (e.g., abnormal battery condition, end of discharge, etc.), the respective battery controller 131a, 131b will output a non-operational signal. The power controller 145 continually monitors whether a non-operational signal has been sent by one of the battery controllers 131a, 131b.

If the power controller 145 receives a non-operational signal from one of the batteries 130a or 130b, the power controller 145 will turn off the respective switching element 155a, 155b. If the power controller 145 receives a non-operational signal from both of the batteries 130a, 130b, the power controller 145 will turn off both switching elements 155a, 155b, and the power tool 100 will not operate.

If the power controller 145 has not received a non-operational signal from the batteries 130a, 130b, the power controller 145 will determine if there is a cross-charging condition on a battery 130a, 130b. In some embodiments (see e.g., FIG. 3b), a cross-charging condition determination is performed by monitoring the current of each battery 130a, 130b. If there is a negative current into one of the batteries 130a, 130b, the power controller 145 will turn off the switching element 155a, 155b of the battery 130a or 130b that is receiving current.

In another embodiment (see e.g., FIG. 3c), a cross-charging condition determination is performed by monitoring the voltage of the batteries 130a, 130b. If the monitored battery voltages are unequal, the power controller 145 will turn off the switching element 155a or 155b of the battery 130a or 130b having the lower voltage.

Figure 3A:
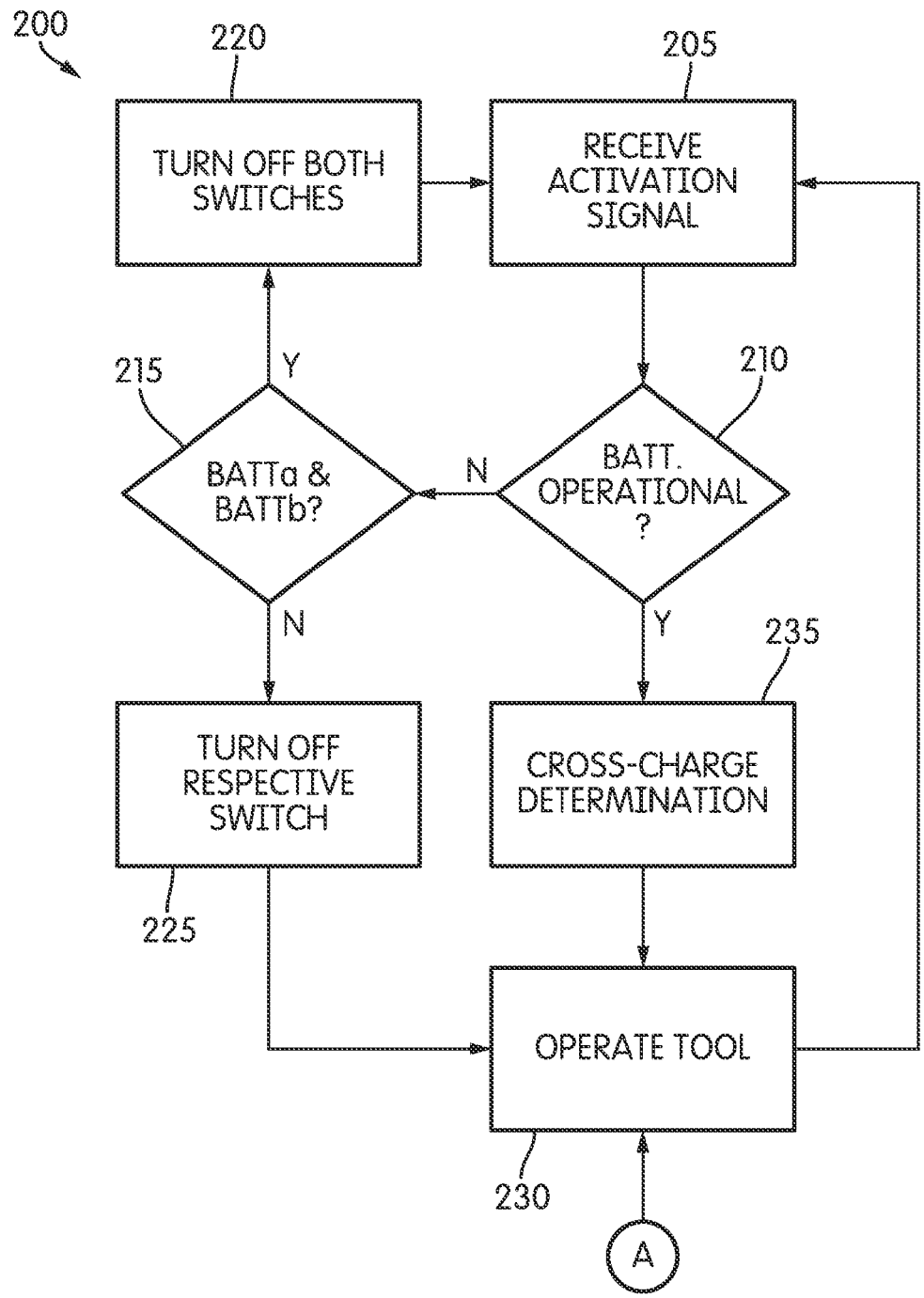
FIGS. 3A-3C illustrate operations of a power controller of the power tool.
Figure 3B:
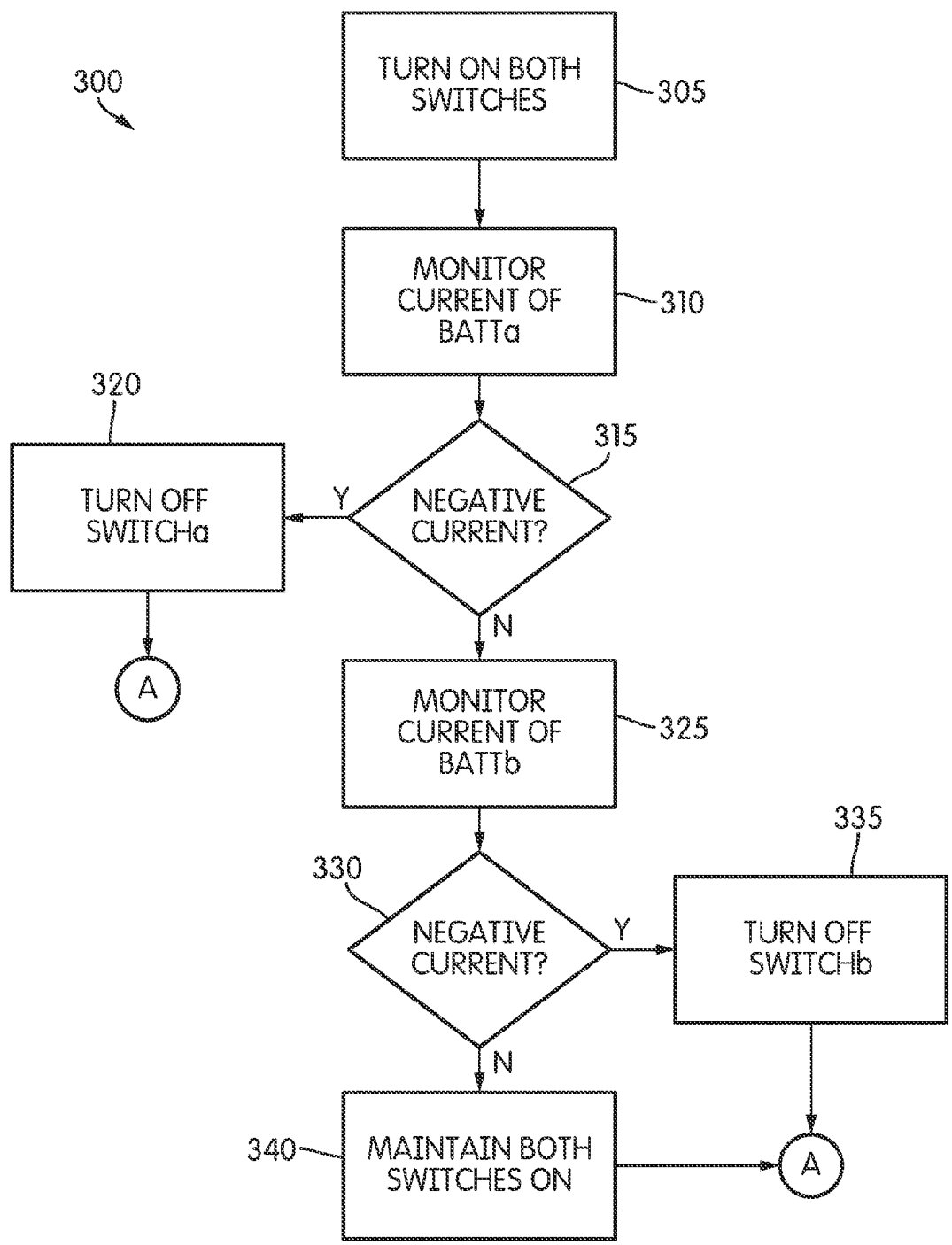

FIG. 3A is a flowchart illustrating operation 200 of the power controller 145. To begin, the tool controller 140 receives an activation signal from the user-switch 107 (Step 205). The power controller 145 determines whether batteries 130a, 130b are operational (Step 210). If one of the batteries 130a or 130b is non-operational, the power controller 145 determines if both batteries 130a, 130b are non-operational (Step 215). If both batteries 130a, 130b are non-operational, the power controller 145 turns off both switching elements 155a, 155b (Step 220) and then cycles back to Step 205. If only one of the batteries 130a, 130b is non-operational, the power controller 145 turns off the respective switching element 155a, 155b (Step 225). The tool is then operated (Step 230), and the operation 200 then returns to Step 205. If both batteries 130a, 130b are determined to be operational in Step 210, the power controller 145 performs a cross-charge determination (for example, as illustrated in FIG. 3b and/or FIG. 3c) (Step 235). The tool is then operated (Step 230), and the operation 200 then returns to Step 205.

FIG. 3B is a flowchart illustrating operation 300 of an embodiment of a cross-charge condition determination based on current monitoring. In operation 300, the power controller 145 turns on both switching elements 155a, 155b (Step 305). The power controller 145 monitors the current of battery 130a (Step 310). The power controller 145 determines if there is a negative current into battery 130a (Step 315). If there is a negative current into battery 130a, the power controller 145 turns off switching element 155a (Step 320). If there is a positive current out of battery 130a, the power controller 145 monitors the current of battery 130b (Step 325). The power controller 145 determines if there is a negative current into battery 130b (Step 330). If there is a negative current into battery 130b, the power controller 145 turns off switching element 155b (Step 335). If there is a positive current out of battery 130a, the power controller 145 maintains both switching elements 155a, 155b in the on position (Step 340). The power controller then moves to Step 230 of the operation illustrated in FIG. 3a.

Figure 3C:
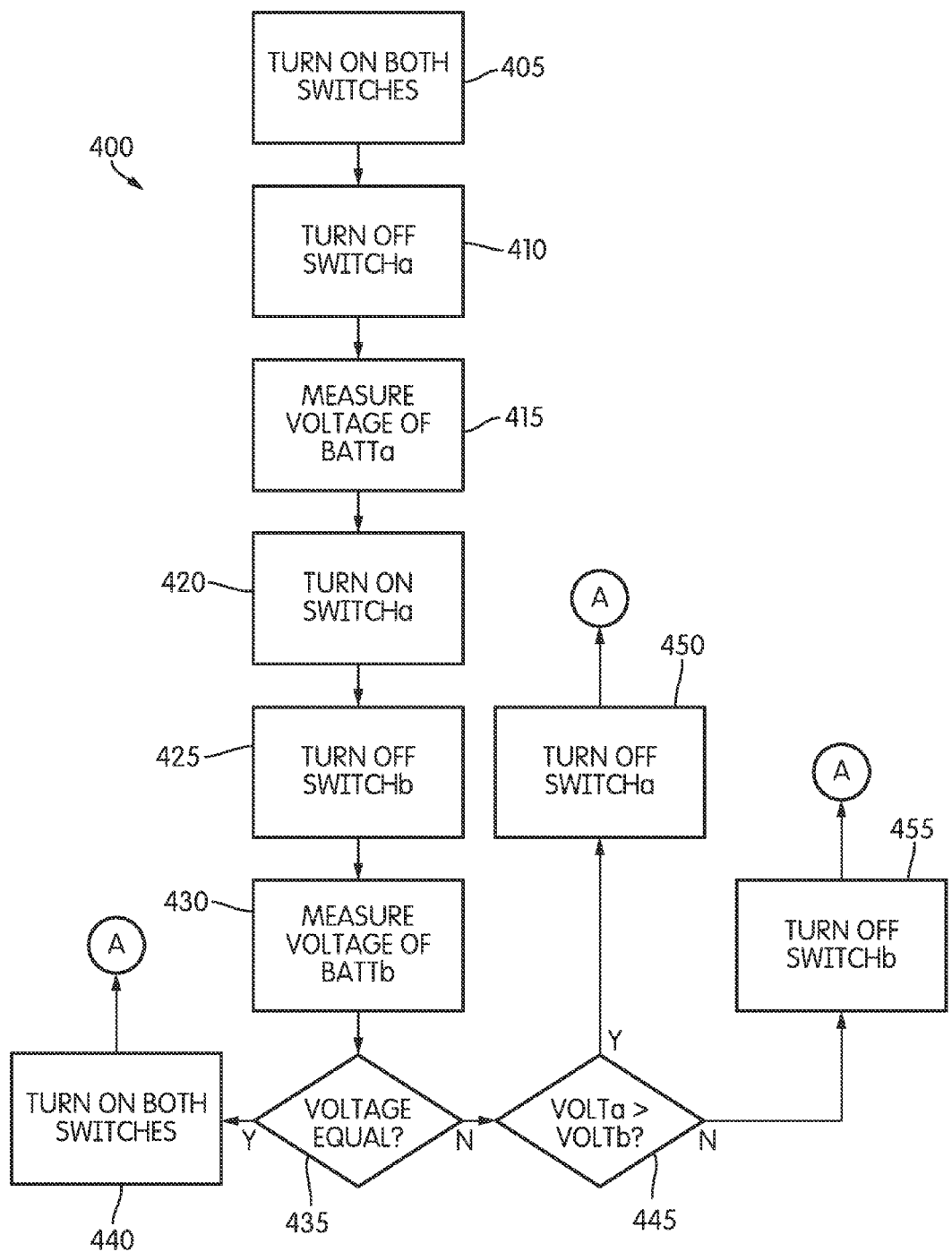

FIG. 3C is a flowchart illustrating operation 400 of an embodiment of a cross-charge condition determination using voltage monitoring. In operation 400, the power controller 145 turns on both switching elements 155a, 155b (Step 405). The power controller 145 turns off switching elements 155a (Step 410). The power controller 145 measures the voltage of battery 130a (Step 415). The power controller 145 turns on switching element 155a (Step 420). The power controller 145 turns off switching element 155b (Step 425). The power controller 145 measures the voltage of battery 130b (Step 430). The power controller 145 determines if the voltage of battery 130a is equal to the voltage of battery 130b (Step 435). If the voltages are equal (e.g., within a range of 0V to 500 mV), the power controller 145 turns on both switching elements 155a, 155b (Step 440), the power controller then moves to Step 230 of the operation illustrated in FIG. 3A.

If the voltages are unequal, the power controller 145 determines if the voltage of battery 130a is greater than the voltage of battery 130b (Step 445). If the voltage of battery 130a is greater than the voltage of battery 130b, power controller 145 turns off switching element 155b (Step 450), the power controller then moves to Step 230 of the operation illustrated in FIG. 3A. If the voltage of battery 130a is not greater than the voltage of battery 130b (and, thus, less than the voltage of battery 130b), the power controller 145 turns off switching elements 155a (Step 455), the power controller then moves to Step 230 of the operation illustrated in FIG. 3A.

In some embodiments, the operation 200 is conducted at a predetermined frequency (e.g., 1 ms intervals, 5 ms intervals, 10 ms intervals, or approximately between 1 ms and 10 ms). In such embodiments, at the predetermined frequency, the power controller 145 cycles through the operation 200.

In some embodiments, the predetermined frequency varies depending on the operating conditions of the power tool 100 and/or of the batteries 130a, 130b. For example, if both batteries 130a, 130b are supplying power to the power tool 100, the frequency is set to a first predetermined frequency; however, if only one battery 130a or 130b is supplying power to the power tool 100, the frequency is set to a different, second predetermined frequency. The frequency may further be dependent on other conditions, such as, for example, one or both of the batteries 130a, 130b having a low or relatively low voltage, the voltages of the batteries 130a, 130b being within a predetermined range of each other, the difference between the voltages of the batteries 130a, 130b, approaching a limit, etc.

Capacitors C1 and C2 are placed between the batteries 130a, 130b and the switching elements 155a, 155b. Capacitors C1 and C2 prevent unclamped inductances and other forms of noise caused by the switching elements 155a, 155b turning on and off. Capacitor C3 is placed between the switching elements 155a, 155b and the tool controller 140 and performs a similar function as capacitors C1 and C2.

As discussed above in relation to operation 300, in some embodiments, the power controller 145 is further configured to monitor the direction of current flow when both switching elements 155a, 155b are turned on. When the power controller 145 senses a negative current into one of the batteries 130a, 130b, the power controller 145 turns off the corresponding switching element 155a, 155b of the battery 130a, 130b receiving the current. In one embodiment, this current flow direction sensing is performed by placing a sense resistor between battery 130a and switching element 155a and a sense resistor between battery 130b and switching element 155b. In an embodiment in which switching elements 155a, 155b are MOSFETs, the power controller 145 monitors the resistance between the source and the drain during an on state (Rds(on)) of switching elements 155a, 155b to sense the direction of current flow.

In one embodiment, rather than switches 155a, 155b, the power tool 100 includes diodes. In this embodiment, the diodes prevent current from flowing into the batteries 130a, 130b, while allowing current to flow out the batteries 130a, 130b.

As noted above, in some embodiments, the tool controller 140 includes switching elements 155a, 155b to control the flow of current to the motor 150. In an embodiment in which the motor 150 is a brushed direct-current motor, the switching elements 155a, 155b can be combined into the tool controller 140. In this embodiment, the switching elements 155a, 155b are selectively activated to perform the additional function of controlling the flow of current to the motor 150. Thus, a separate set of switching elements may be replaced by the multi-function switching-elements 155a, 155b.

It should be understood that many other implementations, combinations, hybrids of the battery switching and/or the motor control power switching functions are possible. For example, in another embodiment (not shown), a tool controller 140 is not provided. In such an embodiment, the switches 155a, 155b directly supply power to the motor 150 and implement motor control power switching functions.

In some embodiments, the switching elements 155a, 155b may oscillate on and off in a hysteretic manner. Hysteretic switching of the switching elements 155a, 155b may be used to prevent unwanted rapid switching of the switching elements 155a, 155b. In other words, the system may delay switching on switching elements 155a, 155b if the switching element 155a, 155b were recently turned off, and vice versa. Hysteretic switching may also be used to prevent unwanted noise caused by the switching on and off of the switching elements 155a, 155b.

In some embodiments, the power controller 145 can communicate with the battery controllers 131a, 131b to shut down the batteries 130a, 130b (e.g., via a switching element in the battery 130a, 130b). For example, the battery controllers 131a, 131b can communicate the state of charge of the individual cells of the batteries 130a, 130b, to the power controller 145, and, if any of the individual cells reach too low of a state of charge, the power controller 145 will shut down the respective battery 130a, 130b (e.g., by sending a "shut down" signal to the battery controller 131a, 131b).

In some embodiments, the batteries 130a, 130b further include internal switches, switching elements, etc. (not shown) which selectively allow current flow out of and into the batteries 130a, 130b. In such embodiments, alternatively or in addition to the switching elements 155a, 155b, the power controller 145 can communicate with the battery controller 131a, 131b to control and/or can directly control the internal switches of the batteries 130a, 130b to regulate the voltages of the batteries 130a, 130b, as discussed above in relation to switching elements 155a, 155b.

Thus, the invention may provide, among other things, a power tool which receives power from parallel-connected batteries. The invention may provide a parallel battery configuration without cross charging, with auto-balancing, etc. The invention may further provide the ability to power the power tool 100 off of one of the batteries 130a, 130b if the other battery is below a certain voltage, is over-heating, is malfunctioning, is not connected to the power tool 100, etc.

By connecting batteries 130a, 130b in parallel, the total system impedance is decreased, which allows batteries 130a, 130b to discharge at the same time and thus have lower overall resistive losses. Lower overall resistive losses may give better efficiency and longer run time. Further, the overall system impedance being lower may allow higher peak operating power when both batteries are at the same state of charge and delivering current.

Thus, the invention provides, among other things, a system and method of a power tool having multiple battery packs. One or more independent features and independent advantages of the invention may be set forth in the claims.

What is claimed is:

1. A method of operating a power tool with a first battery and a second battery connected in parallel, a first switch being connected in series with the first battery and the power tool, a second switch being connected in series with the second battery and the power tool, the method comprising:
   with a controller, monitoring a first voltage of the first battery and a second voltage of the second battery;
   when the first voltage of the first battery and the second voltage of the second battery are within a predetermined range, closing the first switch to connect the first battery to the power tool and closing the second switch to connect the second battery to the power tool;
   when the first voltage of the first battery is outside of the predetermined range of the second voltage of the second battery and the second voltage of the second battery is greater than the first voltage of the first battery, opening the first switch to disconnect the first battery from the power tool; and
   when the second voltage of the second battery is outside of the predetermined range of the first voltage of the first battery and the first voltage of the first battery is greater than the second voltage of the second battery, opening the second switch to disconnect the second battery from the power tool.

2. The method of claim 1, wherein the power tool includes the first switch and the second switch.

3. The method of claim 1, wherein the first battery includes the first switch and the second battery includes the second switch.

4. The method of claim 1, wherein monitoring the voltage of the first battery and the voltage of the second battery includes
   turning on the first switch and the second switch,
   turning off the first switch,
   measuring the first voltage of the first battery,
   turning on the first switch,
   turning off the second switch, and
   measuring the second voltage of the second battery.

5. The method of claim 1, wherein the predetermined range is approximately 500 millivolts.

6. The method of claim 1, further comprising, after closing the first switch to connect the first battery to the power tool and closing the second switch to connect the second battery to the power tool, operating the power tool with the first battery and the second battery.

7. The method of claim 1, further comprising, after opening the first switch, operating the power tool with the second battery.

8. The method of claim 7, further comprising, after opening the first switch and operating the power tool with the second battery, detecting that the first battery and the second battery are balanced and closing the first switch to thereby operate the power tool with the first battery and the second battery.

9. A power tool operable to receive a first battery pack and a second battery pack, the power tool comprising:
   a first battery receptacle configured to receive the first battery pack;
   a second battery receptacle configured to receive the second battery pack;
   a motor;
   a first switch connected in series with the first battery receptacle and the motor;
   a second switch connected in series with the second battery receptacle and the motor; and
   a controller operable to
      monitor a first voltage of the first battery pack and a second voltage of the second battery pack,
      close the first switch and the second switch when the first voltage and the second voltage are within a predetermined range,
      open the first switch when the first voltage is outside of the predetermined range of the second voltage and the second voltage is greater than the first voltage, and
      open the second switch when the second voltage is outside of the predetermined range of the first voltage and the first voltage is greater than the second voltage.

10. The power tool of claim 9, wherein the predetermined range is approximately 500 millivolts.

11. The power tool of claim 9, wherein, when the first switch and the second switch are closed, the first battery pack and the second battery pack are connected in a parallel-type configuration.

12. The power tool of claim 9, wherein, when the first switch is open and the second switch is closed, the power tool is powered by the second battery pack and wherein, when the second switch is open and the first switch is closed, the power tool is powered by the first battery pack.

13. The power tool of claim 9, wherein the controller monitors the voltage of the first battery and the voltage of the second battery by turning on the first switch and the second switch,
   turning off the first switch,
   measuring the first voltage,
   turning on the first switch,
   turning off the second switch, and
   measuring the second voltage.

14. The power tool of claim 9, wherein the first battery pack includes a first battery controller and the second battery pack includes a second battery controller.

15. The power tool of claim 14, wherein the first battery controller senses the first voltage and communicates the first voltage to the controller and the second battery controller senses the second voltage and communicates the second voltage to the controller.

16. A power tool operable to receive a first battery pack and a second battery pack, the power tool comprising:
   a first battery receptacle configured to receive the first battery pack;
   a second battery receptacle configured to receive the second battery pack;
   a motor;
   a first switch connected in series with the first battery receptacle and the motor;
   a second switch connected in series with the second battery receptacle and the motor; and
   a controller operable to
      monitor a first current of the first battery pack and a second current of the second battery pack,
      close the first switch and the second switch when the first current and the second current are positive,
      open the first switch when the first current is negative, and open the second switch when the second current is negative.

17. The power tool of claim 16, wherein the controller monitors the first current by detecting a first current flow direction through the first switch based on a resistance of the first switch, and monitors the second current by detecting a second current flow direction through the second switch based on a resistance of the second switch.

18. The power tool of claim 16, wherein, when the first switch and the second switch are closed, the first battery pack and the second battery pack are connected in a parallel-type configuration.

19. The power tool of claim 16, wherein, when the first switch is open and the second switch is closed, the power tool is powered by the second battery pack and wherein, when the second switch is open and the first switch is closed, the power tool is powered by the first battery pack.

20. The power tool of claim 16, wherein the first battery includes the first switch and the second battery includes the second switch.

* * * * *